United States Patent
Choi et al.

(10) Patent No.: US 9,923,845 B2
(45) Date of Patent: *Mar. 20, 2018

(54) TERMINAL AND METHOD OF HAVING CONVERSATION USING INSTANT MESSAGING SERVICE THEREIN

(71) Applicant: LG Electronics Inc., Seoul (KR)

(72) Inventors: Sung-Bum Choi, Incheon-si (KR); Se Hee Lee, Hwaseong-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,464

(22) Filed: Sep. 29, 2015

(65) Prior Publication Data

US 2016/0021036 A1    Jan. 21, 2016

Related U.S. Application Data

(63) Continuation of application No. 14/265,182, filed on Apr. 29, 2014, now Pat. No. 9,179,271, which is a
(Continued)

(30) Foreign Application Priority Data

Mar. 31, 2008    (KR) .................. 10-2008-0029926

(51) Int. Cl.
*H04Q 7/10*    (2006.01)
*H04L 12/58*    (2006.01)
(Continued)

(52) U.S. Cl.
CPC .......... *H04L 51/04* (2013.01); *H04L 12/1831* (2013.01); *H04L 51/10* (2013.01); *H04W 4/12* (2013.01); *H04L 51/38* (2013.01)

(58) Field of Classification Search
CPC ............... H04N 7/147; H04N 21/4788; H04N 21/4786; H04W 4/12; H04W 88/02; H04L 12/581; H04M 1/656; H04M 1/658
(Continued)

(56) References Cited

U.S. PATENT DOCUMENTS 6,983,370 B2    1/2006 Eaton et al.
7,185,285 B2    2/2007 Van Dok et al.
(Continued)

FOREIGN PATENT DOCUMENTS

EP    1 746 790 A1    1/2007
EP    1 850 546 A2    10/2007
(Continued)

*Primary Examiner* — Kathy Wang-Hurst
*Assistant Examiner* — Julio Perez
(74) *Attorney, Agent, or Firm* — Birch, Stewart, Kolasch & Birch, LLP

(57) ABSTRACT

A mobile terminal including a display unit; a wireless communication unit configured to communicate with at least one external device via a wireless network; and a controller configured to: execute a first message conversation with the at least one external terminal while executing a video communication with the at least one external terminal, and store an image of the video communication in response to termination of the first message conversation.

20 Claims, 26 Drawing Sheets

Related U.S. Application Data continuation of application No. 12/352,188, filed on Jan. 12, 2009, now Pat. No. 8,738,047.

(51) Int. Cl.
   *H04L 12/18*      (2006.01)
   *H04W 4/12*       (2009.01)

(58) Field of Classification Search
   USPC .................. 455/466, 414.1, 414.2; 715/758
   See application file for complete search history.

(56) References Cited

U.S. PATENT DOCUMENTS

| | | | |
|---|---|---|---|
| 2003/0032447 A1* | 2/2003 | Bulthuis | G01S 5/0236 455/556.1 |
| 2006/0009243 A1* | 1/2006 | Dahan | H04L 12/581 455/466 |
| 2006/0036703 A1 | 2/2006 | Fulmer et al. | |
| 2006/0271696 A1* | 11/2006 | Chen | H04L 51/04 709/229 |
| 2007/0053308 A1* | 3/2007 | DuMas | H04L 45/00 370/254 |
| 2007/0216761 A1* | 9/2007 | Gronner | H04N 7/17309 348/14.02 |
| 2007/0242656 A1 | 10/2007 | Klassen et al. | |
| 2008/0003985 A1* | 1/2008 | Jung | H04M 1/72519 455/414.1 |
| 2008/0080679 A1 | 4/2008 | Fernandez et al. | |
| 2008/0134057 A1* | 6/2008 | Yun | H04N 7/147 715/758 |
| 2008/0235370 A1 | 9/2008 | Choi et al. | |
| 2008/0307322 A1* | 12/2008 | Stochosky | G06F 3/0481 715/752 |
| 2009/0138828 A1 | 5/2009 | Schultz et al. | |
| 2010/0058203 A1 | 3/2010 | Moudy et al. | |
| 2011/0105160 A1 | 5/2011 | Tysowski | |

FOREIGN PATENT DOCUMENTS

| | | |
|---|---|---|
| GB | 2 422 266 A | 7/2006 |
| KR | 10-2005-0038733 A | 4/2005 |
| RU | 2 302 033 C2 | 6/2007 |

* cited by examiner (a)

(b)

TERMINAL AND METHOD OF HAVING CONVERSATION USING INSTANT MESSAGING SERVICE THEREIN

CROSS-REFERENCE TO RELATED APPLICATIONS

This application is a Continuation of copending application Ser. No. 14/265,182, filed on Apr. 29, 2014, which is a Continuation of U.S. application Ser. No. 12/352,188 filed on Jan. 12, 2009 (now U.S. Pat. No. 8,738,047), which claims priority under 35 U.S.C. § 119(a) to Application No. 10-2008-0029926, filed in the Republic of Korea on Mar. 31, 2008, all of which are hereby expressly incorporated by reference into the present application.

BACKGROUND OF THE INVENTION

Field of the Invention

The present invention relates to a terminal and corresponding method for conducting a conversation with at least one other terminal using an Instant Messaging Service (IMS).

Discussion of the Related Art

Terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

A related art terminal allows users to communicate or have a conversation with each other using an IMS service provided with their terminal. The user can type text in real-time to another user and can also send and receive photos and other files using the IMS. However, the IMS capabilities are very limited and do not allow the user great flexibility in dealing with different conversations via the IMS service he or she has had with other users.

SUMMARY OF THE INVENTION

Accordingly, one object of the present invention is to address the above-noted and other drawbacks.

Another object of the present invention is to provide a terminal and corresponding method for storing contents of a conversation conducted using the IMS and performing another IMS conversation using the stored contents.

To achieve these objects and other advantages and in accordance with the purpose of the invention, as embodied and broadly described herein, the present invention provides in one aspect, A terminal including a wireless communication unit configured to execute a first conversation with at least one correspondent party using an instant messaging service, a memory configured to store contents of the first conversation, an input unit configured to input a selection signal to select a second conversation be executed using the stored contents of the first conversation, after the first conversation is terminated, and a controller configured to control the wireless communication unit to execute the second conversation with the at least one correspondent party using the stored contents of the first conversation according to the input selection signal.

In another aspect, the present invention provides a method controlling a terminal, and which includes executing a first conversation with at least one correspondent party using an instant messaging service, storing contents of the first conversation, inputting a selection signal to select a second conversation be executed using the stored contents of the first conversation, after the first conversation is terminated, and controlling the wireless communication unit to execute the second conversation with the at least one correspondent party using the stored contents of the first conversation according to the input selection signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
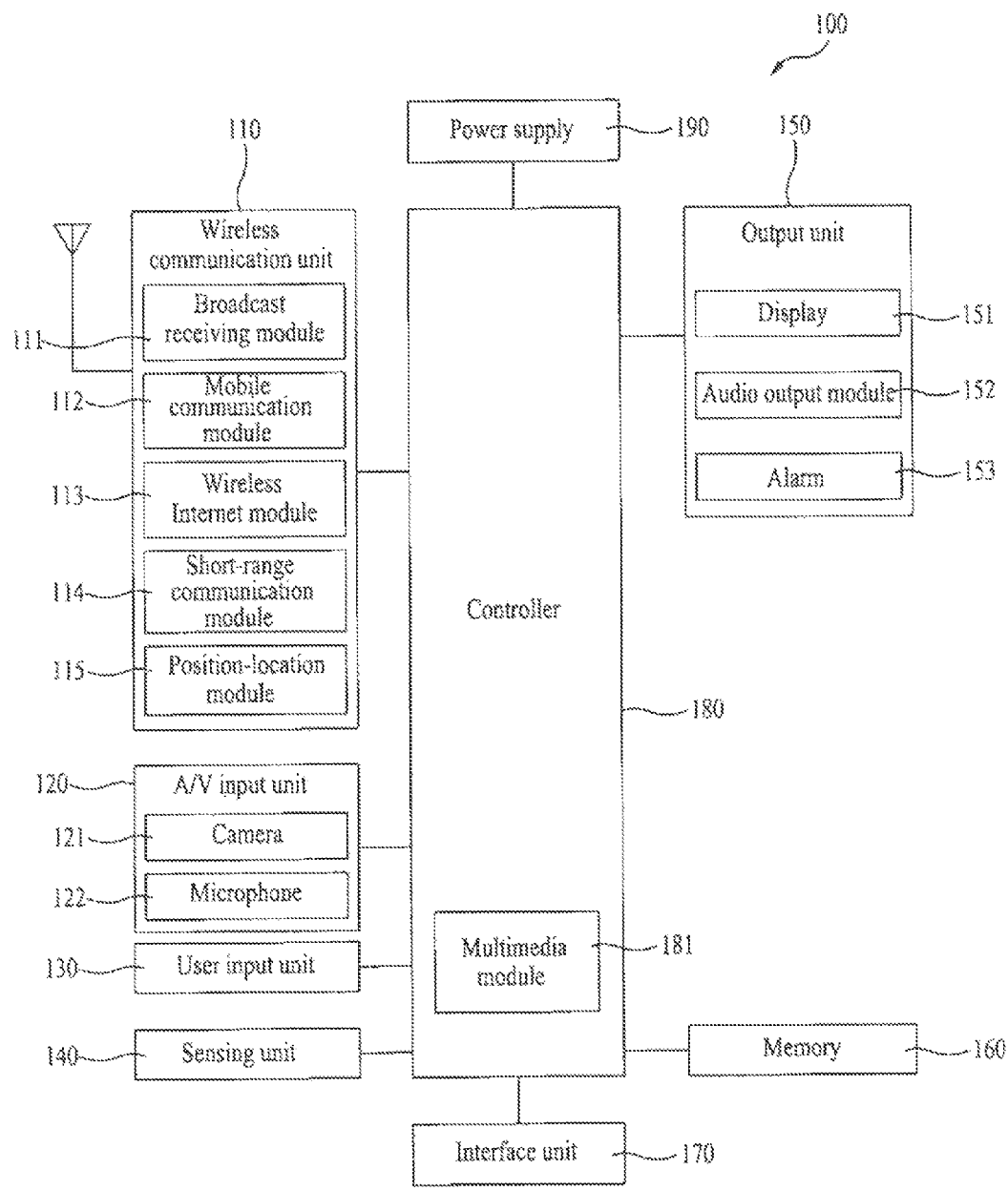
FIG. 1 is a block diagram of a terminal according to an embodiment of the present invention.

FIG. 1 is a block diagram of a mobile terminal 100 according to an embodiment of the present invention. The terminal may be implemented using a variety of different types of terminals. Examples of such terminals include mobile phones, user equipment, smart phones, computers, digital broadcast terminals, personal digital assistants, portable multimedia players (PMP) and navigators, etc.

As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
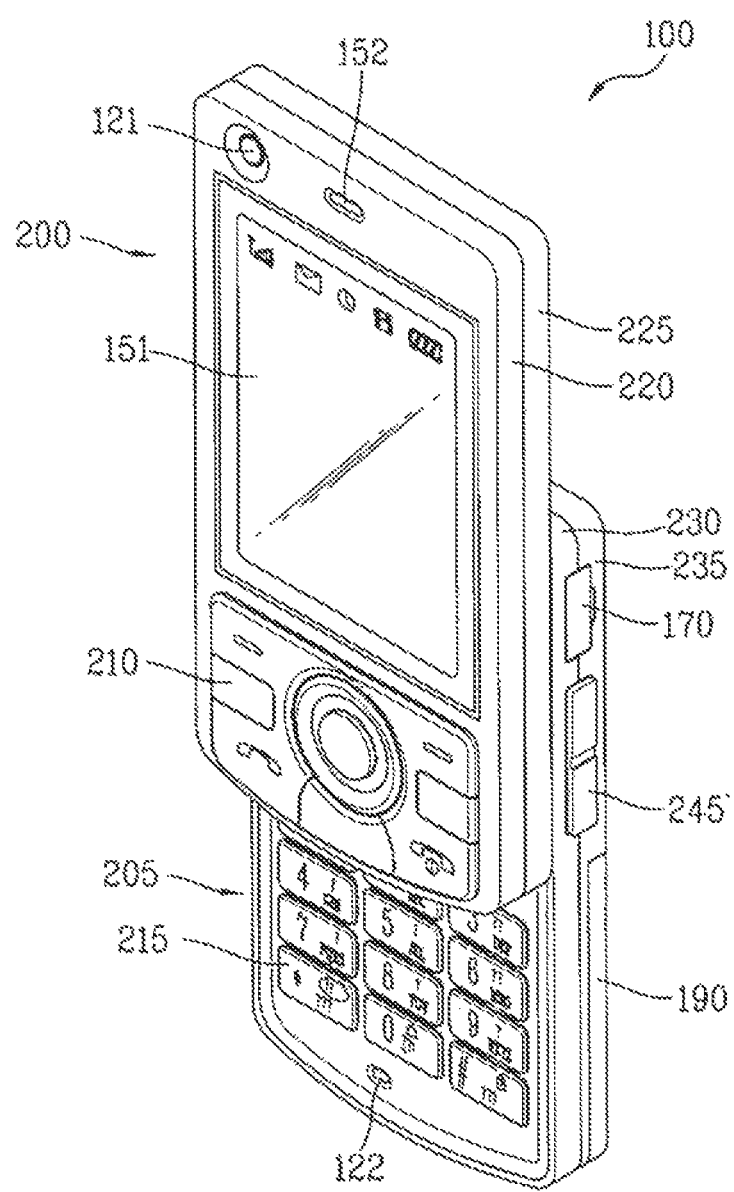
FIG. 2 is a front perspective view of a terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
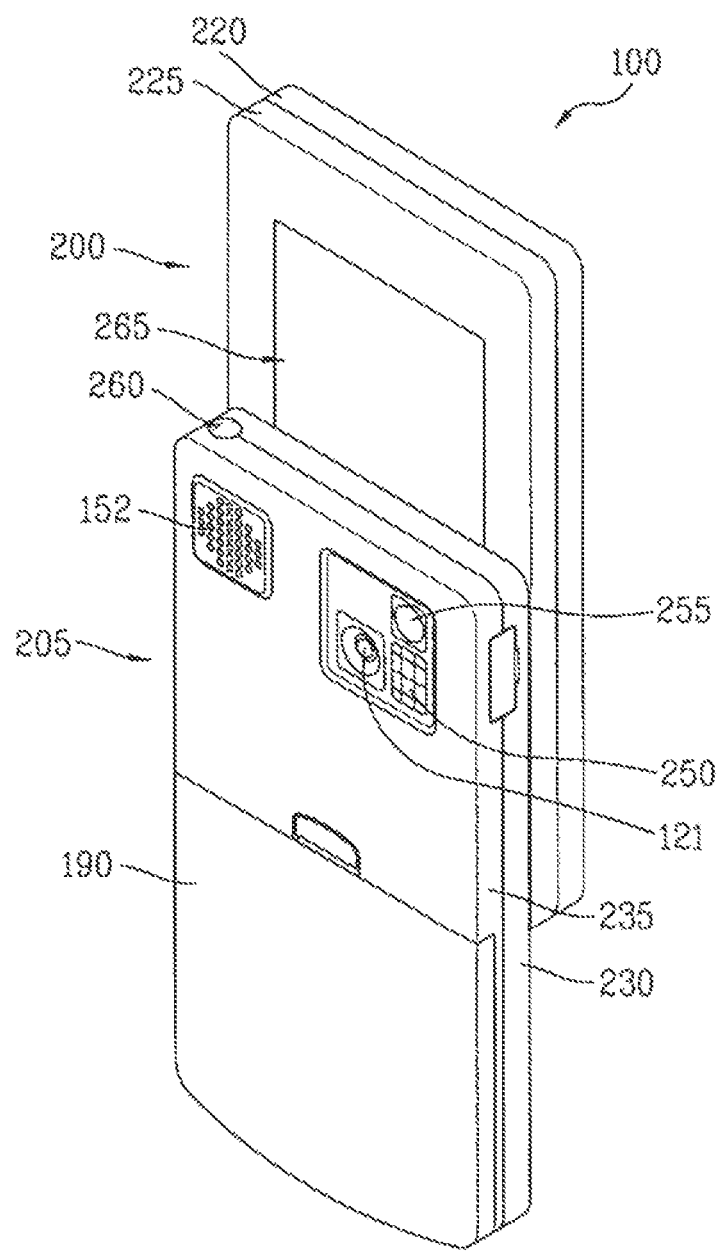
FIG. 3 is a rear perspective view of the terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
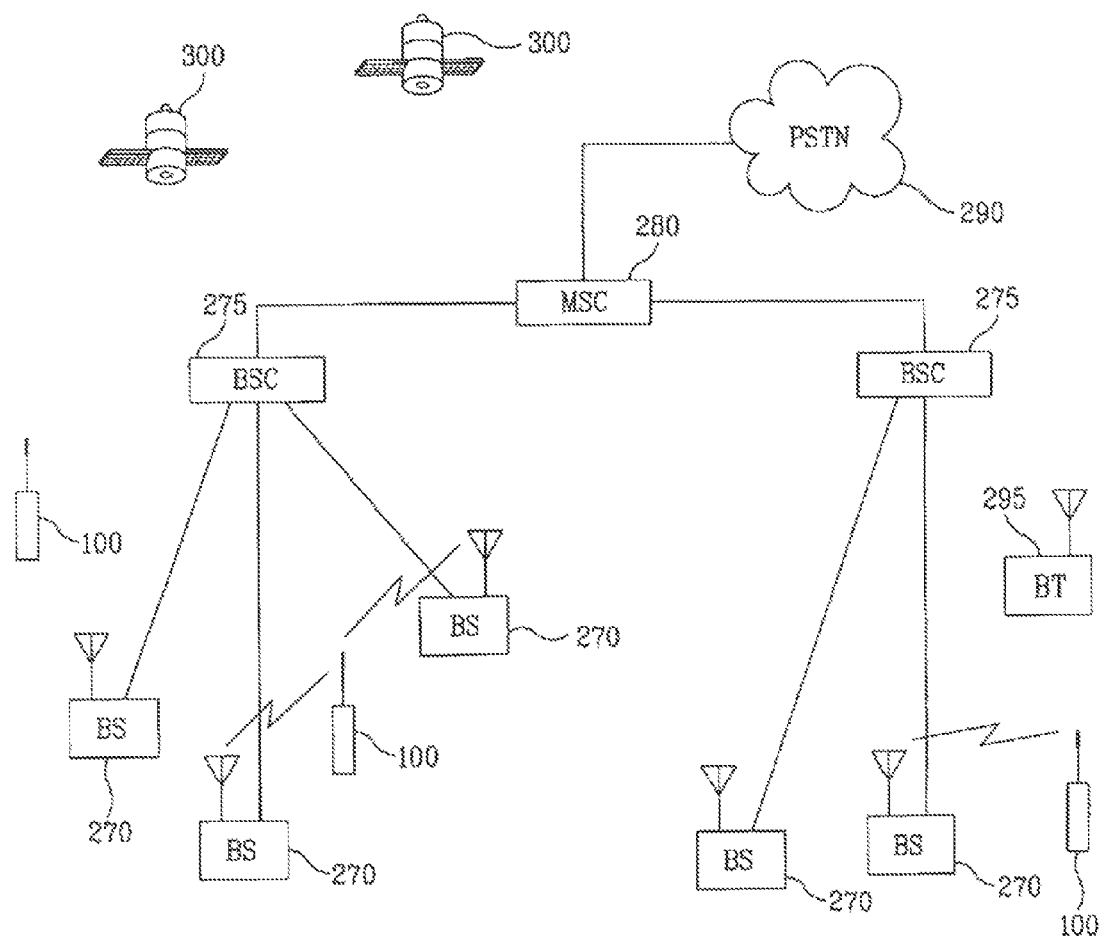
FIG. 4 is a block diagram of a CDMA wireless communication system operable with the terminal of FIGS. 1-3.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

The IMS mentioned in the following description of the present invention is a service capable of performing a real-time data communication including a text conversation, a voice conversation, a video conversation, a file transmission/reception, etc. based on an Internet protocol between a plurality of terminals provided with the IMS implementation functions. The IMS also supports a mobile IMS between mobile terminals.

Figure 5:
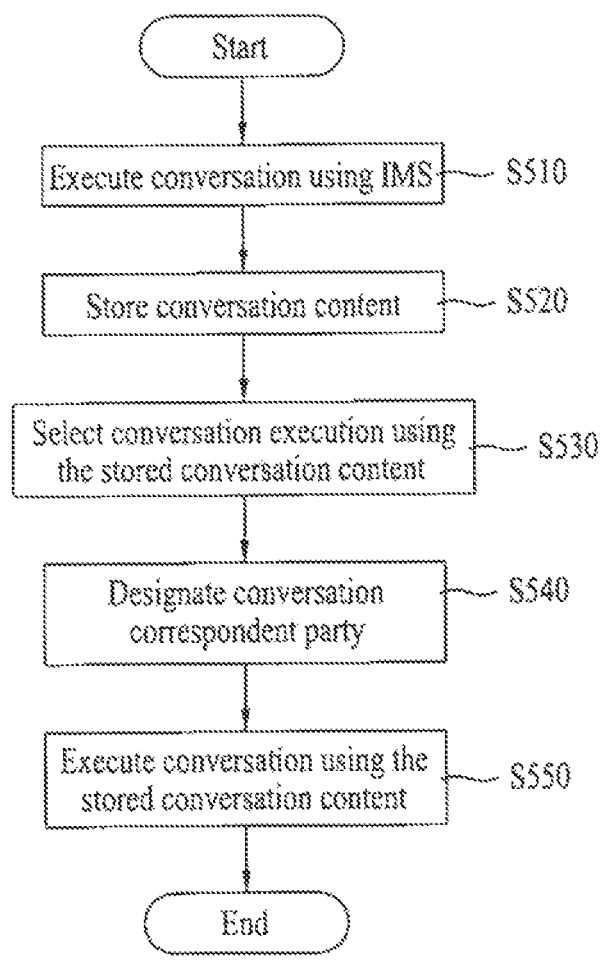
FIG. 5 is a flowchart illustrating a conversation method using an IMS in a terminal according to one embodiment of the present invention.

FIG. 5 is a flowchart illustrating a conversation method using an IMS in a terminal according to one embodiment of the present invention. FIG. 1 will also be referred to throughout this description. Further, as discussed above, the conversation using the IMS can include a voice conversation, a video conversation, a text conversation, etc. In the present description, the conversation or communication between different users will assumed to be a text conversation, but the present invention applies to all other types of IMS conversations. In addition, the conversations can be between two users or between a plurality of users (i.e., 1:N conversations).

In addition, before performing a conversation process using the IMS according to an embodiment of the present invention, the terminal 100 initiates an IMS with a server that manages the IMS. That is, to perform this initiation process, the terminal 100 receives initiation information (or log-on information), e.g., an ID (identification), password or various types of authentication information from a user via the user input unit 130.

Further, when receiving the initiation information from the user, the terminal 100 sends an initiation request message of the IMS to a server via the wireless communication unit 110, and more particularly, via the wireless Internet module 113. The terminal 100 then receives an acknowledgement message for approving authority of the terminal 100 for using the IMS from the server.

Referring to FIG. 5, the terminal 100 executes a conversation with at least one correspondent party via the wireless communication module 110, and more particularly, via the wireless Internet module 113 using the IMS (S510). Subsequently, the terminal 100 stores contents of the conversation in the memory 160 (S520).

In addition, the storing step S520 can be performed if there exists a user's setting operation or if the conversation is forcibly terminated. For instance, 'if the user's setting operation exists' corresponds to a situation that 'automatic storage of contents of the conversation for an end of conversation or a conversation in progress' is preset by a user, and a situation that 'contents of the conversation storage' is selected by a user for an end of conversation or a conversation in progress, or the like.

Also, 'if the conversation execution is forcibly terminated' corresponds to a situation that an IMS or a conversation is terminated due to a wireless Internet access interruption attributed to network instability, terminal power-off, conversation disconnection by a correspondent party, video call connection or the like. If the conversation is forcibly terminated, the terminal 100 automatically stores the contents of the conversation or may store the contents of the conversation if a user selects a conversation storage option (presetting or end timing point).

In addition, if the contents of the conversation are not stored by one of the above mentioned methods, the terminal 100 can receive the contents of the conversation from a correspondent terminal via the wireless communication unit 110 and then store the received contents of the conversation in the memory 160. In this instance, the terminal 100 sends a contents of the conversation transmission request message to the correspondent terminal and then receives the corresponding contents of the conversation, or can receive the contents of the conversation from the correspondent terminal unilaterally regardless of the request.

The storing step S520 will now be explained with reference to the accompanying drawings. In more detail, FIGS. 6A to 6C are display screens illustrating a process for storing contents of the conversation when the conversation is terminated by a user's selection in a terminal according to one embodiment of the present invention.

Figure 6A:
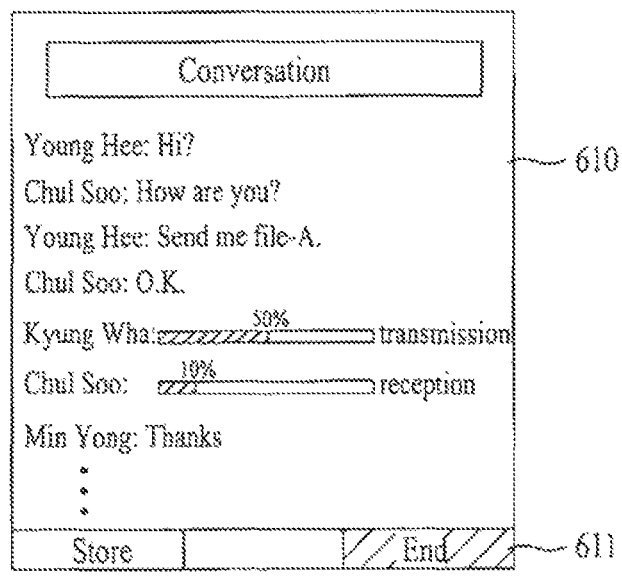
FIGS. 6A to 6C are overviews of display screens illustrating a process for storing contents of the conversation when the conversation is terminated by a user's selection in a terminal according to one embodiment of the present invention.
Figure 6A:
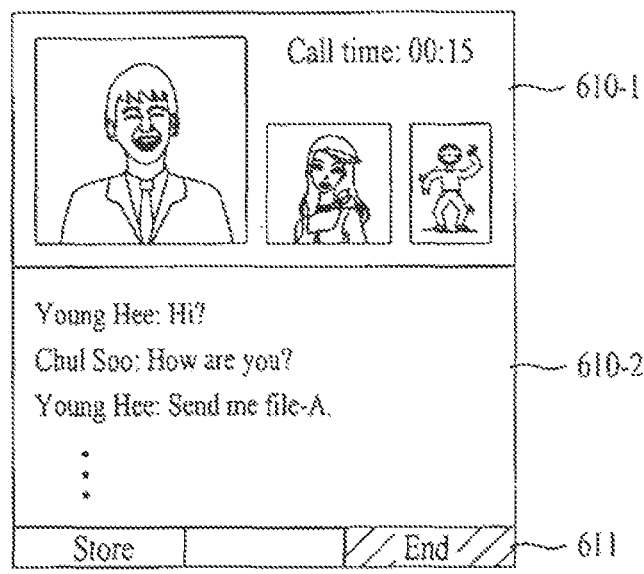
Figure 6B:
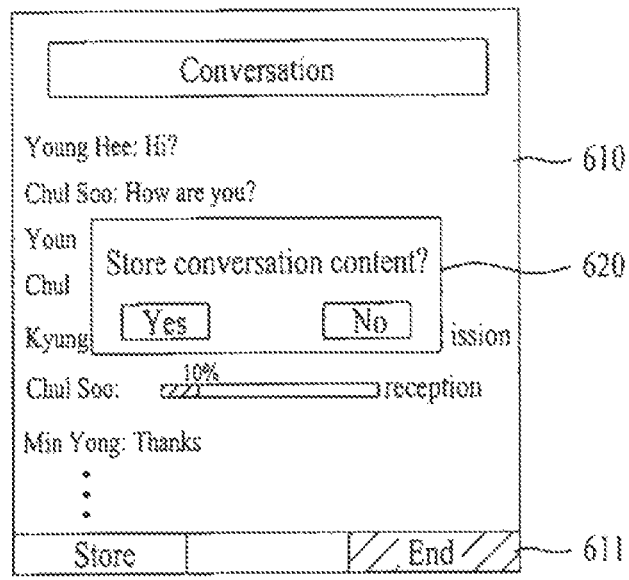

When having a text conversation only (FIG. 6A(a)) or together with a video call (FIG. 6A(b)), if the user selects an End option 611 to terminate the conversation in FIG. 6A, the terminal displays a window 620 allowing the user to store the contents of the conversation (FIG. 6B).

Figure 6C:
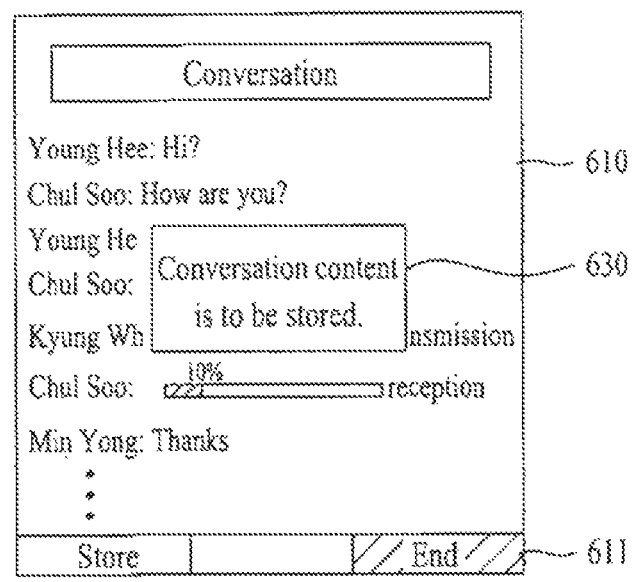

Then, if the user selects the 'Yes' option in the window 620, the terminal 100 stores the contents of the contents of the conversation and outputs a phrase 630 or other type of indication indicating that the contents of the conversation has been stored (FIG. 6C).

In addition, in another embodiment, the user can preset a particular storage option such as 'automatic storage of the contents of the conversation when the conversation is terminated'. In this instance, the terminal 100 directly enters the stage shown in FIG. 6C without executing the stage shown in FIG. 6B.

Figure 7A:
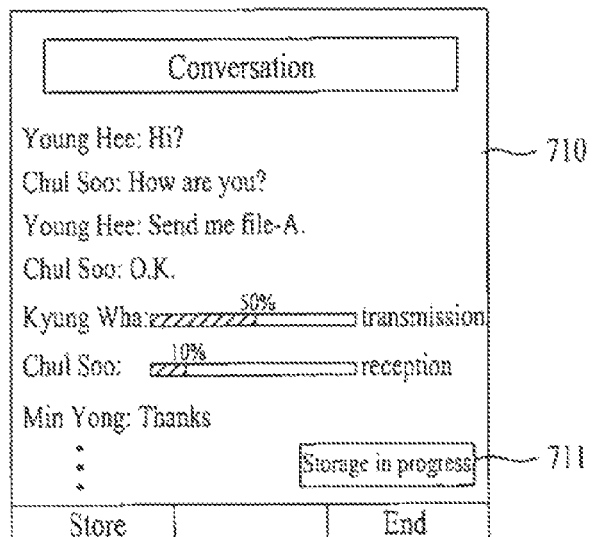
FIGS. 7A and 7B are overviews of display screens illustrating a process for storing contents of the conversation during the conversation in a terminal according to another embodiment of the present invention.
Figure 7B:
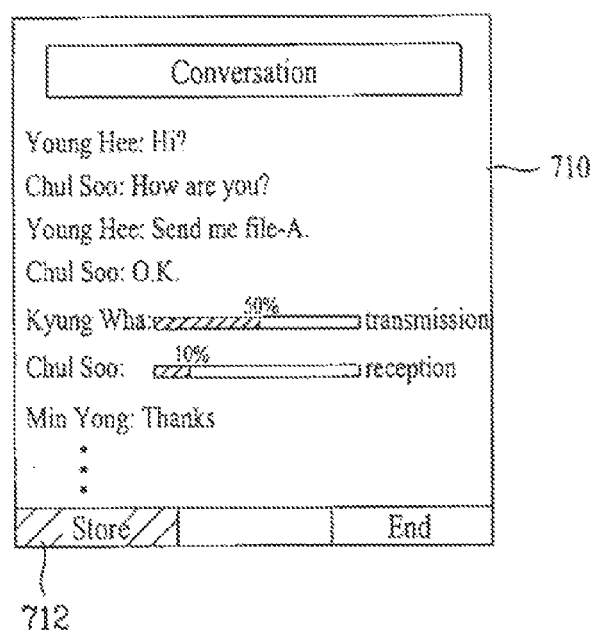

Next, FIGS. 7A and 7B are overviews of display screens illustrating a process for storing contents of the conversation in a terminal according to another embodiment of the present invention. In this embodiment, when the user presets the 'automatic storage of the contents of the conversations during the conversation', the terminal 100 stores the contents of the contents of the conversation at a random timing point or periodically (FIG. 7A).

The terminal 100 also displays an identifier 711 indicating that the contents of the conversation are being stored on a prescribed area of the screen (FIG. 7A). Further, the identifier can be represented as one of various methods including an icon, a symbol, a text, an image, a voice announcement, a bell sound, an audio signal, a vibration, flashing lights, etc. The user can also set the type of identification using the appropriate menu options provided with the terminal according to an embodiment of the present invention.

In addition, and as shown in FIG. 7B, if the user selects a Store option 712 to store the contents of the conversation during the conversation, the terminal stores the contents and informs the user the contents are being stored.

Figure 8A:
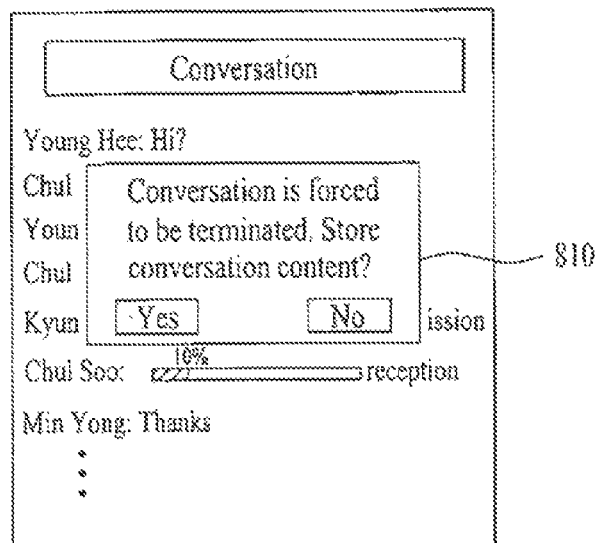
FIGS. 8A and 8B are overviews of display screens illustrating a process for storing contents of the conversation when the conversation is forcibly terminated in a terminal according to one embodiment of the present invention.
Figure 8B:
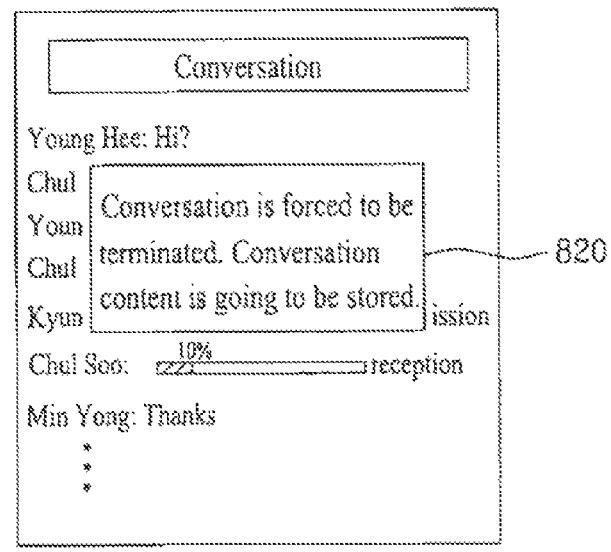

Next, FIGS. 8A and 8B are overviews of display screens illustrating a process for storing contents of a conversation when the conversation is forcibly terminated in a terminal according to one embodiment of the present invention.

In this embodiment, when the conversation is forcibly terminated during the course of the conversation, the terminal 100 displays a window 810 indicating that the conversation is forcibly terminated and allowing the user to select whether or not to store the contents of the contents of the conversation (FIG. 8A). If the user selects the 'Yes' option, the terminal 100 stores the contents of the conversation and outputs a phrase announcing that the contents of the conversation has been stored.

Alternatively, and as shown in FIG. 8B, when the conversation is forcibly terminated during the course of the conversation, the terminal 100 automatically stores the contents of the conversation and then displays a phrase 820 indicating that the contents of the conversation has been stored. FIG. 8B is also applicable to situation in which the user has preset the automatic storing of the contents of the conversation.

In addition, in the storing step S520 in FIG. 5, the terminal 100 also provides the user with the option of editing and storing the contents of the conversation in the memory 160. Further, the option of editing the contents can be executed when storing the contents of the conversation or on previously stored contents of the conversation.

The editing operation will now be explained with reference to FIGS. 9A and 9B. In more detail, FIGS. 9A and 9B are overviews of display screens illustrating a process for editing and storing contents of the conversation when the terminal 100 stores the contents of the conversation according to one embodiment of the present invention.

Figure 9A:
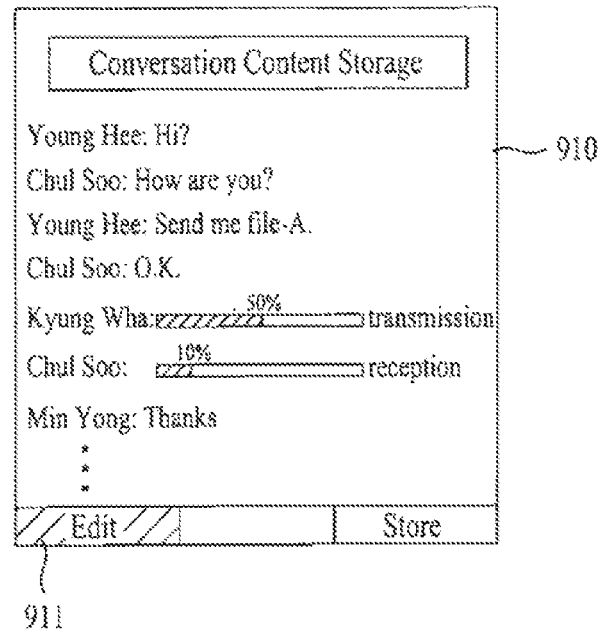
FIGS. 9A and 9B are overviews of display screens illustrating a process for editing and storing contents of the conversation in a terminal according to one embodiment of the present invention.
Figure 9B:
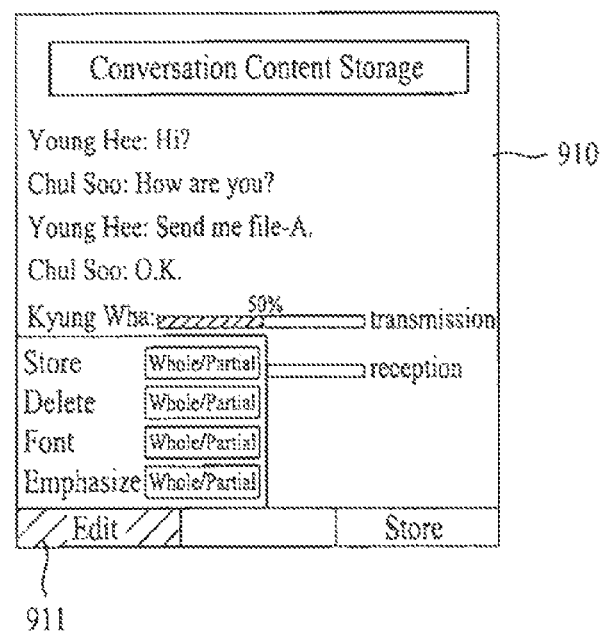

As shown in FIG. 9A, when the user selects an Edit option 911 for editing the contents of the conversation, the terminal 100 displays an editing operation list on a screen of the terminal 100 (FIG. 9B). For instance, the editing operation list can include a storing option, a deletion option, a font setting option, an emphasis option, etc.

Each of these editing operations can be performed on a whole part or a prescribed portion of the contents of the conversation. Further, the editing operation list can include all types of editing operations executable on text as well as the above-mentioned operations. Also, the prescribed portion of the contents of the conversation can include a partial content of the conversation, contents of the conversation with a specific correspondent party, a specific phrase, and the like.

Therefore, based on the editing operation selected from the editing operation list, the terminal 100 performs one of the storing operation, the deleting operation, the font setting operation, the emphasizing operation and the like on the whole part or a prescribed portion of the contents of the conversation.

Further, in the storing step S520 in FIG. 5, if the terminal 100 is transceiving a file or executing a multiple service when storing the contents of the conversation, the terminal 100 stores state information relevant to the file transceiving or the multiple service execution in the memory 160 together with the contents of the conversation.

In addition, the multiple services include a service for simultaneously executing a plurality of Internet protocol based wireless data transceiving services including an IMS, a video call service, a video sharing service, a network game service, a broadcast signal sharing service and the like.

For instance, referring to FIG. 6A(a), if a file transceiving is in progress when the contents of the conversation are being stored, the terminal 100 stores file transceiving state information such as a file transceiving subject, file information, a file transceiving progress rate, a file storage location (if the terminal 100 is in the course of transmission), and the like.

Referring to FIG. 6A(b), if multiple services and more particularly, a conversation via the IMS and a video call service are being executed when storing the contents of the conversation, the terminal 100 stores multiple service relevant state information such as a video call subject, images of capturing the video call in termination, a terminal identification number of a video caller, and the like.

Referring again back to FIG. 5, after completion of the termination and storage of the contents in step S510, the terminal 100 allows a user to select a conversation execution operation, which uses a previously stored contents of the conversation (hereinafter named 'previous contents of the conversation'), according to a selecting operation by the user via the user input unit 130 (S530).

The selecting step S530 will now be explained in more detail. In particular, FIGS. 10 to 11B are overviews illustrating a process for allowing a user to view contents of a previous conversation according to one embodiment of the present invention is displayed.

Figure 10:
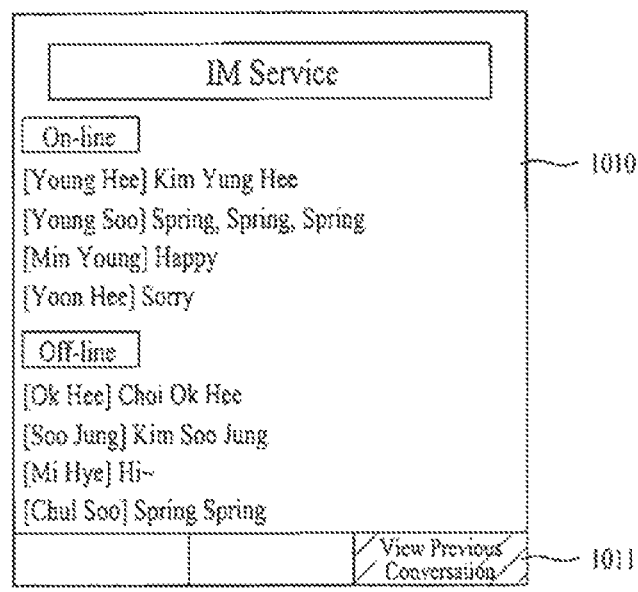
FIGS. 10 to 11B are overviews of display screens illustrating a process for allowing a user to view contents of previous conversations in a terminal according to one embodiment of the present invention.

Referring to FIG. 10, while displaying a correspondent party list 1010 including a plurality of correspondent parties agreed to mutually execute data communication via the IMS, the terminal 100 displays a View Previous Conversation option 1011 that the user can select.

Figure 11A:
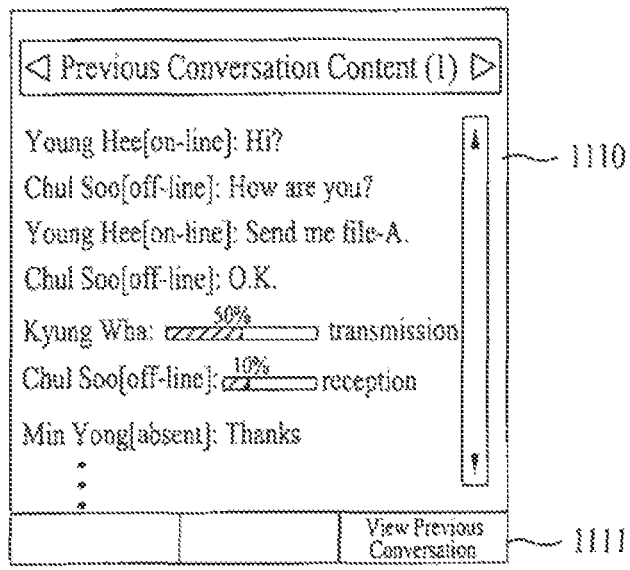
Figure 11B:
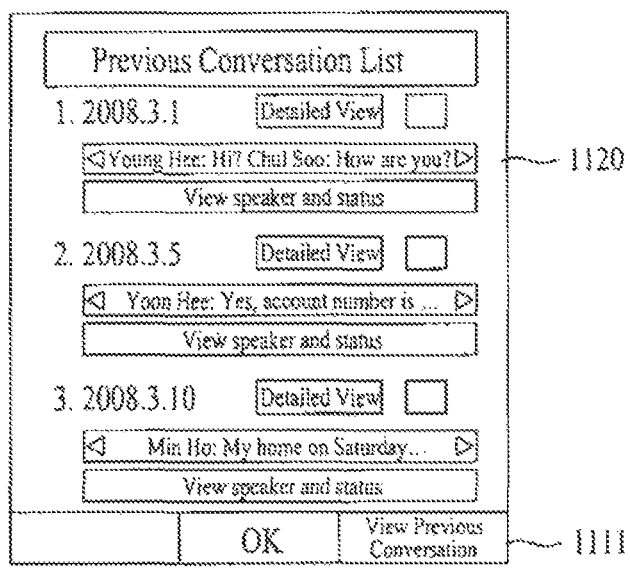

If user selects the View Previous Conversation option 1011 in FIG. 10, as shown in FIG. 11A, the terminal 100 displays a previous conversation list 1110 on the screen. The user can also scroll through the list 1110 to see additional users he or she has had a previous conversation with using the scroll bar, a direction key and the like. The terminal 100 also displays current status information of the parties the user previously had a conversation with (e.g., [on-line, [off-line], etc.). The terminal 100 also displays some of the contents of the previous contents for the listed parties.

Further, if the user selects a party from the list 1110 and selects the View Previous Conversation option 1111 in FIG. 11A, the terminal 100 displays the contents of the previous conversation for that particular user. Further, in another embodiment as shown in FIG. 11B, if the user selects the View Previous Conversation option 1011 in FIG. 10, the terminal 100 displays a previous conversation list 1120 including at least one previous conversation item. As shown, the previous conversation list 1120 includes, per the previous conversation item, a date, an area for selecting previous contents of the conversation provision, a portion of a contents of the conversation, an area for indicating a correspondent party of a previous conversation and selecting a current status information provision of each correspondent party and the like.

For instance, if a content viewing area of a specific previous conversation item is selected, the terminal 100 displays the previous contents of the conversation corresponding to the specific previous conversation item on a screen of the terminal. If a correspondent party information viewing area of a specific previous conversation item is selected, the terminal 100 displays a correspondent party participating in the previous conversation of the specific previous conversation item and current status information of each correspondent party on a screen of the terminal 100. In addition, if the user selects the View Previous Conversation option 1111 in FIG. 11B, the terminal 100 displays the previous contents of the conversation.

Figure 12A:
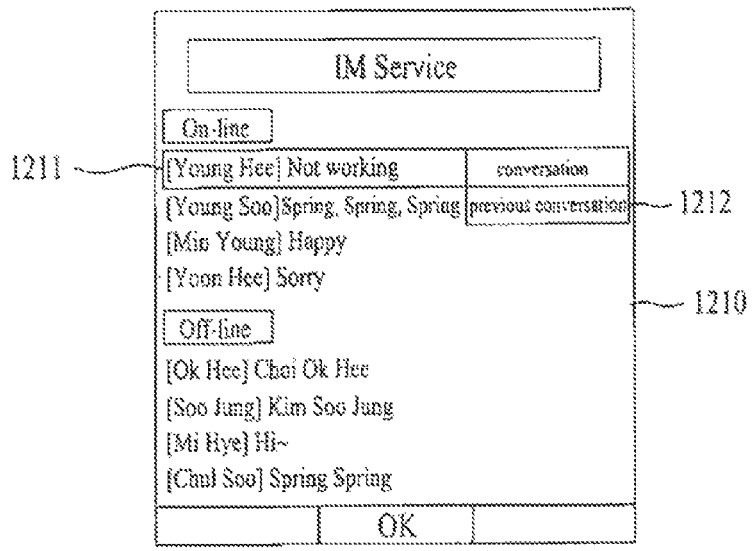
FIGS. 12A and 12B are overviews of display screens illustrating a process for allowing a user to view previous conversations or conduct another conversation with a party via contents of a corresponding previous conversation in a terminal according to one embodiment of the present invention.
Figure 12B:
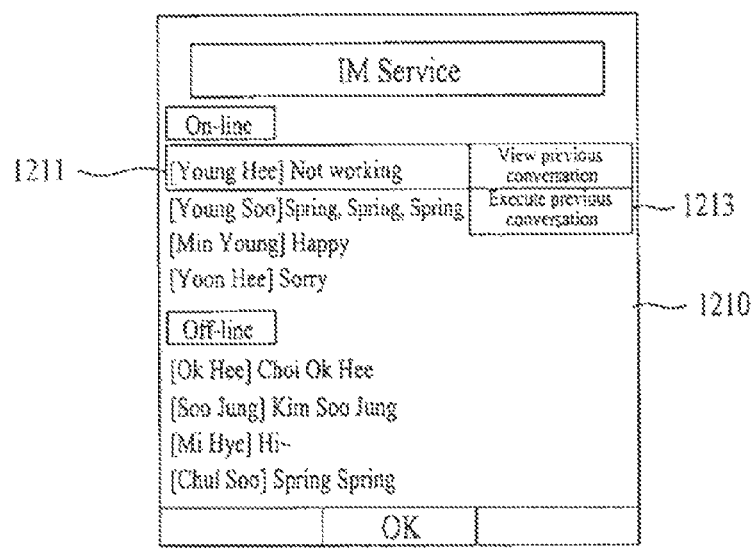

Next, FIGS. 12A and 12B are overviews illustrating processes for allowing a user to execute a new conversation via a list of users or via previously stored contents in a terminal according to one embodiment of the present invention.

As shown in FIGS. 12A and 12B, a user is able to select a correspondent party to have a conversation with from a displayed correspondent party list 1210. For example, if the user selects 'Young Hee', the terminal 100 sends a conversation request to a terminal of 'Young Hee' via the wireless communication unit 110 and then performs a conversation with the correspondent party designated as 'Young Hee'.

Further, as shown in FIG. 12A, when the user selects 'Young Hee' as a conversation correspondent party, the terminal displays options 1212 including 'conversation' (with 'Young Hee') or 'previous conversation' (with 'Young Hee'). If the user selects the 'previous conversation' option in FIG. 12A, the terminal 100 displays options 1213 (see FIG. 12B) including 'View previous conversation' (with 'Young Hee') and 'Execute previous conversation' (with the 'Young Hee').

Then, if the user selects 'View previous conversation from the options 1213 in FIG. 12B, the terminal 100 displays the contents of the previous conversation with 'Young Hee'. If the user selects the 'Execute previous conversation' option from the options 1213 in FIG. 12B, the terminal 100 initiates a new or another conversation between the correspondent party of the previous conversation and the user using the contents of the previous conversation with the correspondent party 'Young Hee'.

Thus, in FIG. 12A, the user can select the 'previous conversation' option from the options 1212 in FIG. 12A, and then select the "View Previous conversation' option from the options 1213 in FIG. 12B to view the contents of the previous conversation with the party selected in FIG. 12A. Alternatively, the user can select the 'Execute previous conversation' option to establish another IMS session with the selected party. In addition, the user can also select the 'conversation' option in FIG. 12A to conduct a normal IMS session with the corresponding party.

Further, in one example, the terminal 100 can conduct or execute a conversation with the correspondent party based on the contents of the previous conversation using the correspondent party's user ID (selected in FIG. 12A or by reading the correspondent party's ID from the stored contents) or by using other information in the stored contents (e.g., IP address, telephone number, etc.). The terminal 100 can also advantageously display the contents of the stored previous conversation when starting the new conversation with the correspondent party such that both parties can quickly determine where the previous conversation had ended.

Figure 13A:
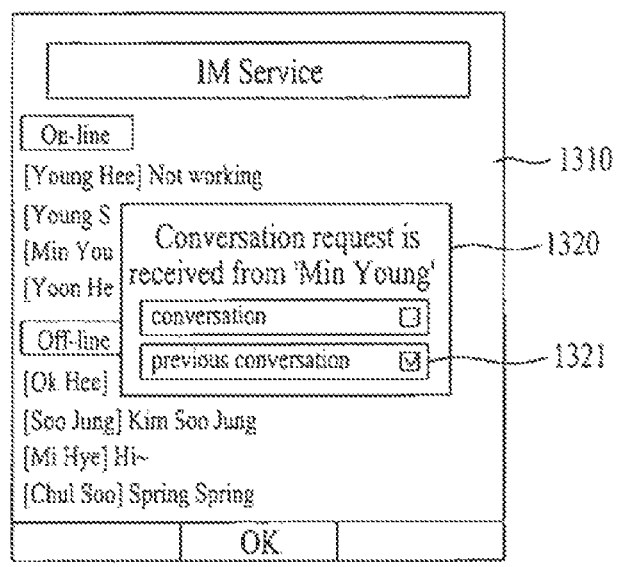
FIGS. 13A and 13B are overviews of display screens illustrating a process for enabling a conversation to be executed with a specific correspondent party to be selected in a terminal according to one embodiment of the present invention.
Figure 13B:
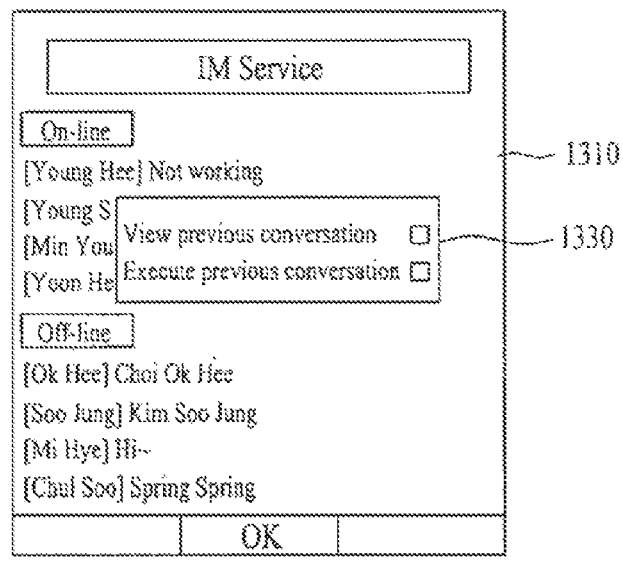

Next, FIGS. 13A and 13B are overviews of display screens illustrating a process for allowing a user to execute a conversation with a specific selected correspondent party in a terminal according to one embodiment of the present invention is displayed. In this embodiment, the terminal 100 receives a conversation request from a specific one of a plurality of correspondent parties contained in a correspondent party list 1310 and performs a conversation with the specific correspondent party in response to the conversation request.

For example, and as shown in FIG. 13A, if the terminal 100 receives a conversation request from 'Min Young', the user is able to select options including 'conversation' or 'previous conversation' 1321 with 'Min Young'. If the user selects the 'previous conversation' option 1321 in FIG. 13A, the terminal 100 displays a window 1330 including the options 'View previous conversation' and 'Execute previous conversation' (see FIG. 13B). The user can then select the 'View previous conversation' option to view the contents of the previous conversation with 'Min Young' or select the 'Execute previous conversation' option to have the terminal 100 initiate another IMS conversation with 'Min Young'. As discussed above, the terminal 100 can create the new IMS conversation session to include the contents of the previous conversation so each user can easily see where the previous conversation ended.

In addition, if there is a plurality of previous conversations with the correspondent party 'Min Young', the terminal 100 performs a conversation using the previous conversation selected by the user or the previous conversation that was last performed. Also, if the user selects the 'View previous conversation' option in FIG. 13B, the terminal 100 displays the contents of the previous conversation with the correspondent party 'Min Young' on the screen of the terminal. In addition, in FIG. 13A, if the user selects the 'conversation' option in FIG. 13A, the terminal 100 performs a normal conversation with the correspondent party 'Min Young' using an IMS.

Figure 14:
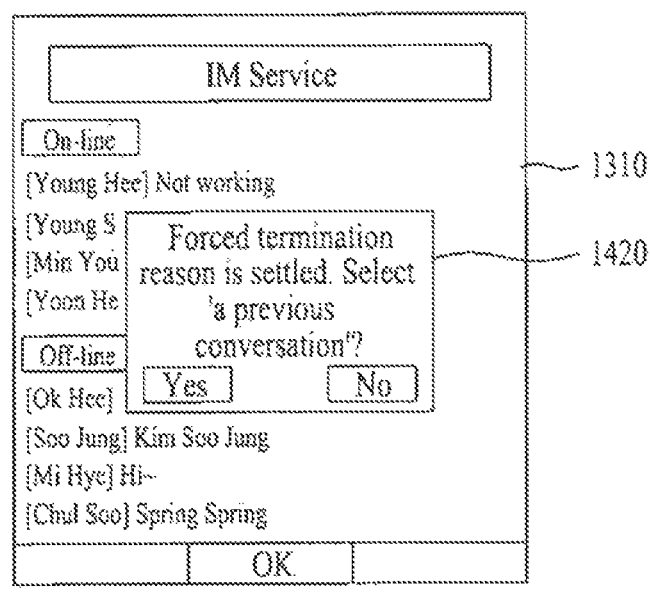
FIG. 14 is an overview of a display screen illustrating a process for enabling a conversation to be executed to be selected in a terminal according to one embodiment of the present invention is displayed.

Next, FIG. 14 is an overview of a display screen illustrating a process for allowing a user to execute a conversation when a conversation that way forcibly terminated is fixed in a terminal according to one embodiment of the present invention is displayed.

Referring to FIG. 14, if the conversation that has been forcibly terminated has been fixed or settled, the terminal 100 announces that the reason for the forced termination of the conversation has been settled and displays a window 1420 allowing the user to select whether to execute a conversation using the stored previous contents of the conversation according to the forced termination of the conversation. If the user selects the 'Yes' option, the terminal 100 restarts the previous conversation or starts a new conversation by designating the correspondent party or parties of the forcibly terminated conversation and the user.

In addition, in this embodiment, the terminal 100 displays the correspondent party list 1310 when the window 1420 is displayed. However, the terminal 100 can display the window 1420 at anytime other than when displaying the correspondent party list 1310. Further, if the previous IMS connection is still available, the terminal 100 can use this IMS connection to restart the IMS conversation again. Alternatively, if the problem has been fixed, but the previous IMS connection is not available, the terminal 100 can request another IMS connection using the correspondent party's username, etc.

Referring again to FIG. 5, the terminal 100 designates a correspondent party to participate in a conversation using the previous contents of the conversation (S540). For instance, the designating step S540 can be performed by the controller 180 according to an input signal via the user input unit 130.

In addition, in the designating step S540, the terminal 100 designates a correspondent party selected by the user via the user input unit 130 or automatically designates a party in a status capable of having a conversation. Furthermore, in the designating step S540, if the terminal 100 is transmitting a file together with a previous conversation, the terminal 100 designates at least one of a presence or non-presence of a file transmission and a file receiving correspondent party according to an input signal via the user input unit 130.

Also, in the designating step S540, if the terminal 100 is receiving a file together with a previous conversation, the terminal 100 sends a message containing information for designating at least one of a presence or non-presence of a file transmission and a file receiving correspondent party to the correspondent party of the file, which is being received, via the wireless communication unit 110 according to an input signal via the user input unit 130.

In addition, the designating step S540 can be omitted in the present invention, if necessary. If the designating step S540 is omitted, the terminal 100 designates all parties of the previous conversation as the correspondent parties of the conversation to be executed using the contents of the previous conversation and designates a subject of a file transceived in the course of the previous conversation as all correspondent parties (except a file transmitting party).

The designating step S540 will now be explained in more detail. That is, FIGS. 15A to 18 are overviews of display screens illustrating a process of designating a correspondent party using previous contents of the conversation, a file transmission control operation and a file reception control operation in a terminal according to one embodiment of the present invention.

Figure 15A:
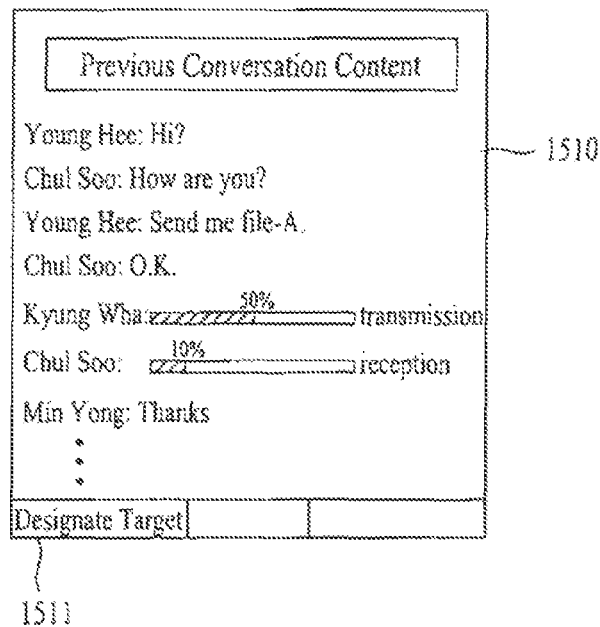
FIGS. 15A to 18B are overviews of display screens illustrating a process of designating a correspondent party, a file transmission control operation and a file reception control operation in a terminal according to one embodiment of the present invention.

In this embodiment, while the terminal 100 displays a window 1510 including previous contents of a conversation with a particular party, the user is able to select a 'Designate Target' option 1511 for designating a correspondent party to being a new IMS session with, a file transmitting target, a file receiving target and the like (FIG. 15A).

Figure 15B:
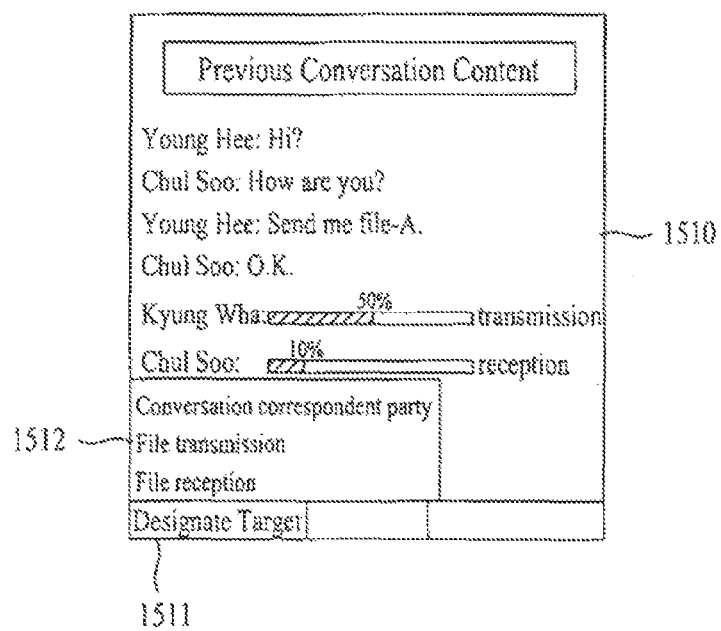
Figure 16:
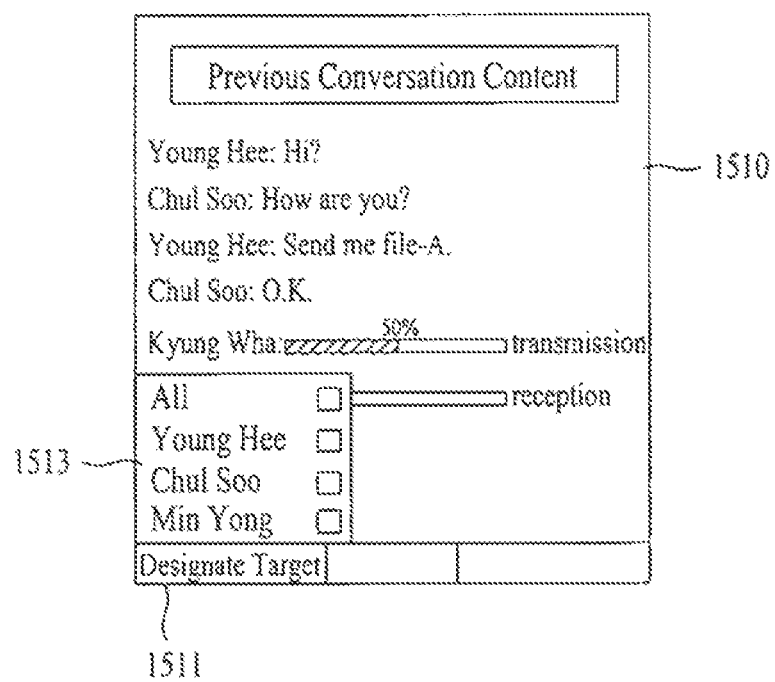

That is, if the user selects the 'Designate Target' option 1511, the terminal 100 displays a designated target list 1512 (FIG. 15B). If the user selects the 'Conversation correspondent party' option from the designated target list 1512, the terminal 100 displays a list 1513 of all parties that participated in the previous conversation (FIG. 16). Therefore, the user is able to select a correspondent party to participate in a conversation with using the previous contents of the conversation from the list 1513.

Figure 17:
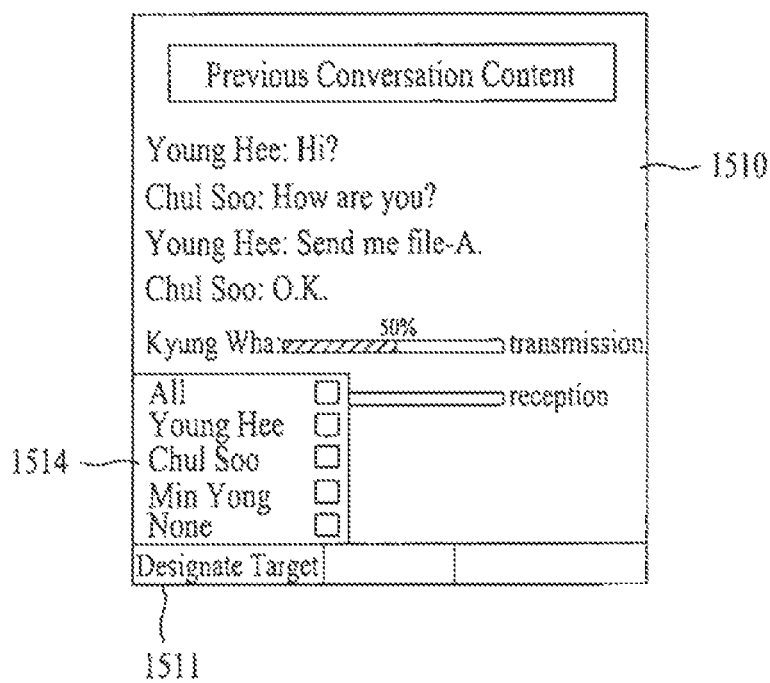

In addition, in FIG. 15B, If the user selects the 'File transmission' option from the designated target list 1512, the terminal 100 displays a list 1514 of correspondent parties that have participated in the previous conversation (FIG. 17).

Figure 18A:
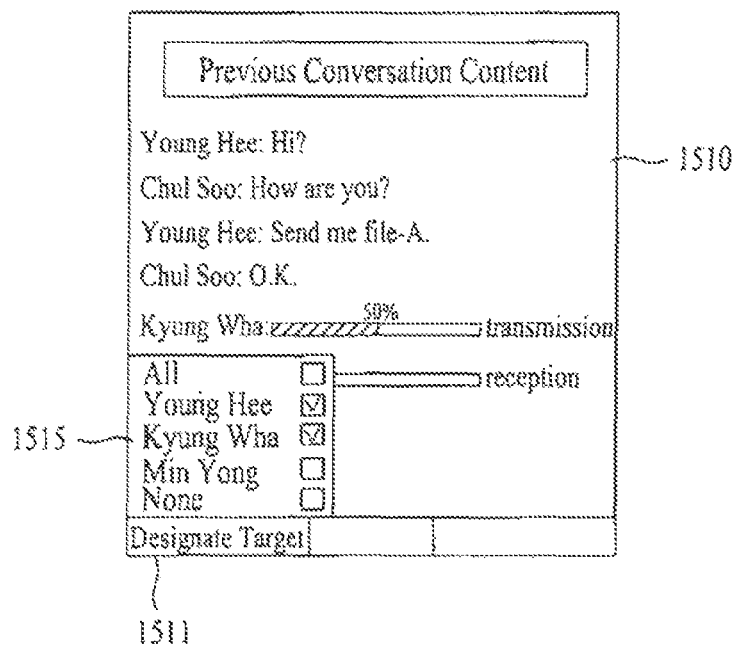

Thus, the user is able to designate a transmission subject of the file, which was being transmitted by the terminal 100 in the conversation using the previous contents of the conversation, from the list 1514. Similarly, if the user selects the 'File reception' option from the designated target list 1512 in FIG. 15B, the terminal 100 displays a list 1515 of parties (except a file transmitting correspondent party) having participated in the conversation corresponding to the displayed previous contents of the conversation (FIG. 18A).

Therefore, the user is able to designate a receiving correspondent party of the file, which was being received from the file transmitting correspondent party in the conversation, using the previous contents of the conversation, from the list 1515.

Figure 18B:
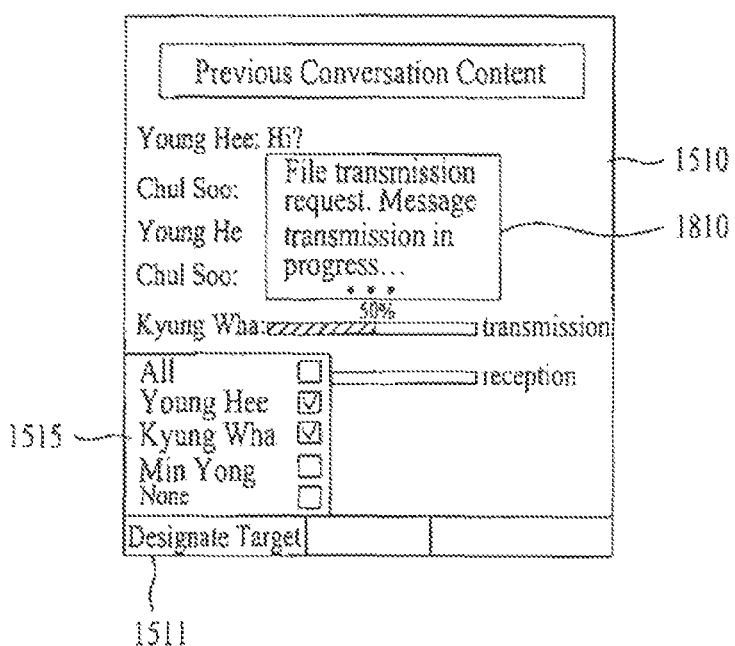

Subsequently, the terminal 100 transmits a message, which contains at least one information or item including a presence or non-presence of file reception and a file receiving correspondent party, to the file transmitting correspondent party and informs the user that a file transmitting request message is in progress to the selected party or parties (FIG. 18B).

Further, as current status information of each of the correspondent parties having participated in the previous conversation shown in FIGS. 15 to 18B is displayed together, the user can easily select a conversation correspondent party or a receiving correspondent party of a file which was being transmitted by a terminal of a specific correspondent party.

Referring again to FIG. 5, if the conversation execution using the previous contents of the conversation is selected in the selecting step S530, the terminal 100 executes a conversation using the previous contents of the conversation via the wireless communication unit 110, and more particularly, via the wireless internet module 113 (S550).

Further, prior to performing the conversation executing step S550, the terminal 100 can transmit a message announcing that a conversation using the previous contents of the conversation will be executed to the correspondent party or parties of the conversation using the previous contents of the conversation. In doing so, the terminal 100 is able to transmit the previous contents of the conversation together. Thus, a terminal of the correspondent party can selectively display the previous contents of the conversation as the conversation using the previous contents of the conversation is executed.

Further, as mentioned in the foregoing description, the conversation correspondent party can include a correspondent party (or parties) corresponding to the previous contents of the conversation or person(s) designated as the conversation correspondent party (parties).

If there exists a party that is unavailable among the correspondent parties, the terminal can transmit a message announcing that a conversation using the previous contents of the conversation will be executed to the unavailable person.

Therefore, when a status of the unavailable person is changed into an available status, the unavailable person understands that the conversation using the previous contents of the conversation is in progress and is then able to decide whether to participate in the conversation.

Further, the unavailable person includes a person who is substantially unable to participate in the conversation due to a current status including log-off, absence, conversation rejection or the like. In particular, if the correspondent party (or parties) is in the unavailable status, the person is unable to perform the conversation using the previous contents of the conversation.

If a status at least one of the correspondent parties is changed into the available status in the future, the conversation using the previous contents of the conversation can be performed by notifying the changed status to the user.

Also, if a file transmission was in progress in a previous conversation and if the user decides to transmit the file, the terminal 100 transmits the file, which was being transmitted in the previous conversation, to a file receiving correspondent party while performing the conversation executing step S550.

Similarly, if a file reception was in progress in a previous conversation and if the user decides to receive the file, the terminal 100 receives the file, which was being received in the previous conversation, from a file transmitting correspondent party while performing the conversation executing step S550.

If the file transmitting correspondent party is a an unavailable person, the terminal 100 informs the user that the file reception is not possible at this time. In addition, if the file transmitting correspondent party enters an available status, the terminal 100 notifies the new status to the user. Hence, the terminal 100 enables the file transmitting correspondent party to transmit the file, which was being transmitted in the previous conversation, by leading the file transmitting correspondent party to participate in the conversation using the previous contents of the conversation.

The conversation executing step S550 will now be explained in more detail. In particular, FIGS. 19 to 22B are overviews of display screens illustrating a process of displaying conversation statuses in a terminal according to one embodiment of the present invention.

Figure 19:
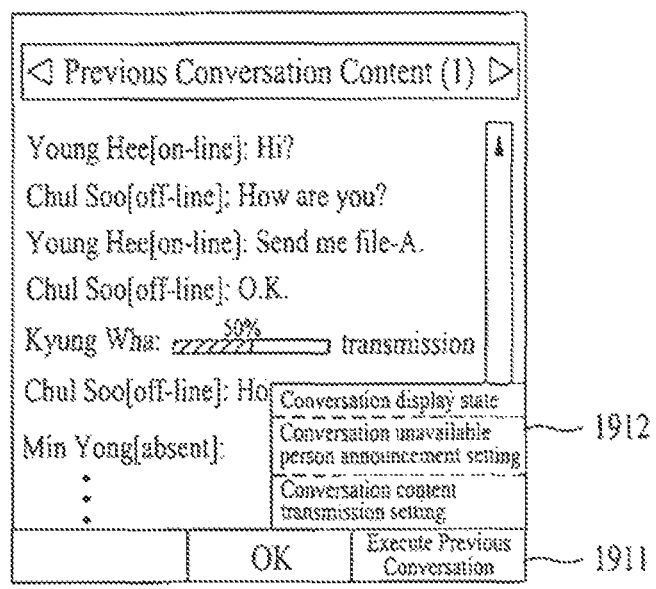
FIGS. 19 to 22B are overviews of display screens illustrating a process of displaying conversation statuses in a terminal according to one embodiment of the present invention.

Referring to FIG. 19, while the terminal 100 displays contents of the previous conversation, the user can select an "Execute Previous Conversation option 1911 in the terminal 100. Then, if the user selects the option 1911, the terminal 100 displays a window 1912 including the options 'Conversation display state', 'Conversation unavailable person announcement setting' and 'Conversation content transmission setting'.

Figure 20A:
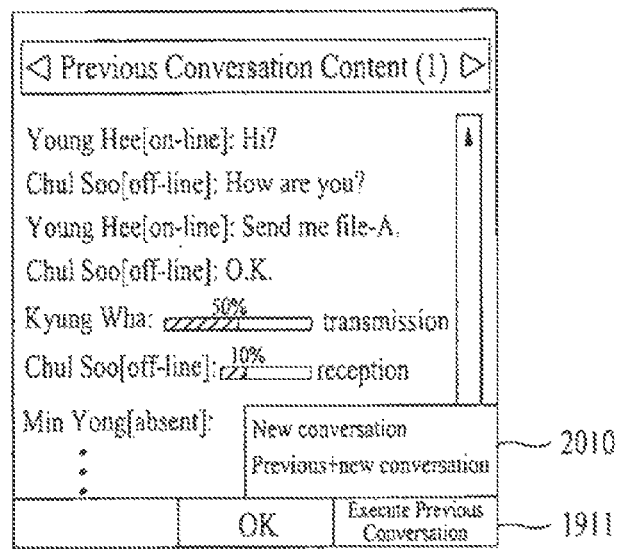

If the user selects the 'Conversation display status' option in FIG. 19, the terminal 100 displays a window 201 in FIG. 20A allowing the user to select to display a new contents of the conversation only ('new conversation') or both the previous contents of the conversation and the new contents of the conversation ('previous+new conversation').

Figure 20B:
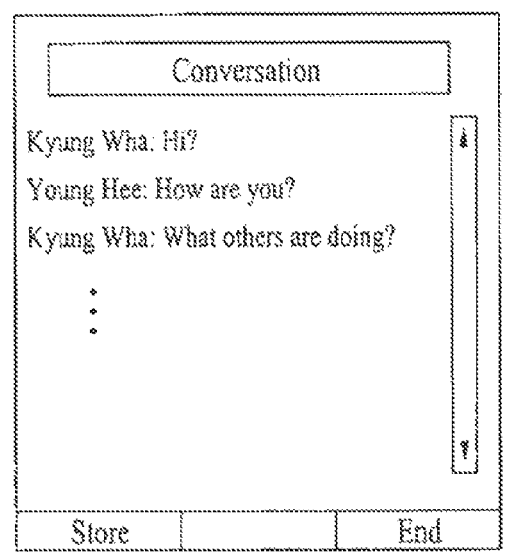

If the user selects the 'new conversation' option in FIG. 20A, the terminal 100 displays only the contents of the conversation of a currently executed conversation even when executing the conversation using the previous contents of the conversation (FIG. 20B).

Figure 20C:
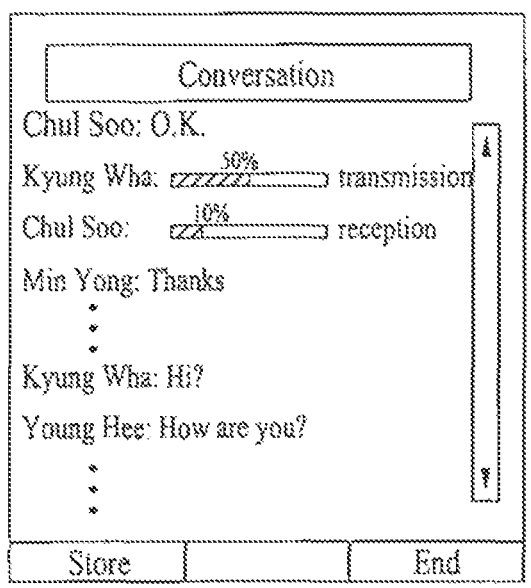

Alternatively, if the user selects the 'new+previous conversation' option in FIG. 20A, the terminal 100 displays both of the previous contents of the conversation and the contents of the conversation of the currently executed conversation (FIG. 20C).

Figure 21A:
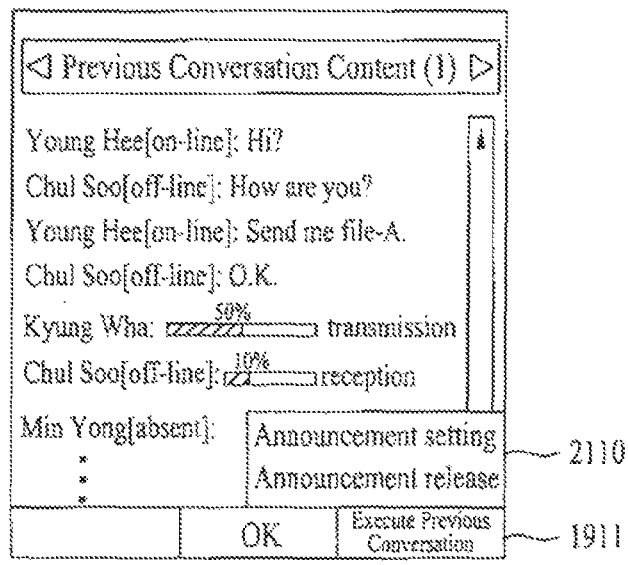

Further, if the user selects the 'Conversation unavailable person announcement setting' option in FIG. 19, the terminal 100 displays a window 2110 allowing the user to select options including 'Announcement setting' or 'Announcement release' (FIG. 21A). Further, the user is also able to select the options 'Announcement setting' or 'Announcement release' for an unavailable party (not shown in the drawings).

Figure 21B:
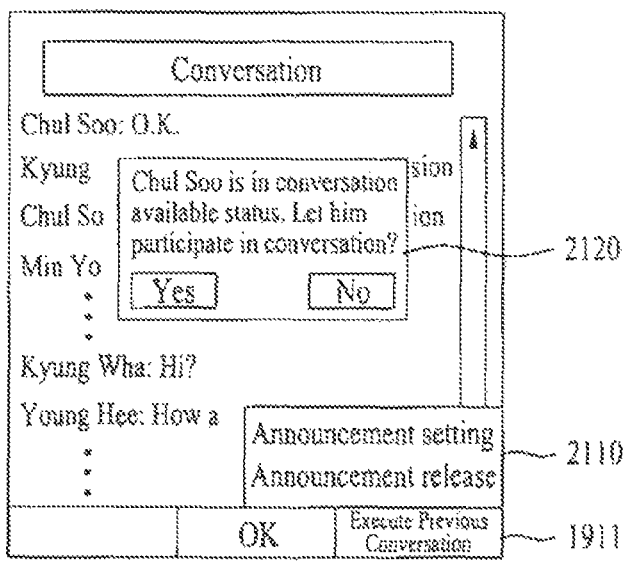

If the user selects the 'Announcement setting' option in FIG. 21A, when an unavailable person enters an available status, the terminal 100 announces that a correspondent party that used to be unavailable is now able to participate in a conversation and then allows the user to select whether or not to let the person participate in the conversation (FIG. 21B). Thus, if the user selects the 'Yes' option to let the person participate in the conversation, the terminal 100 allows the correspondent party, who used to be unavailable, to participate in the currently executed conversation using the previous contents of the conversation.

If the user selects the 'Announcement release' in FIG. 21A, the terminal 100 does not announce that the conversation unavailable person is now in an available status. Meanwhile, it is also possible that if a conversation participation is selected by the correspondent party that used to be unavailable, the terminal 100 enables the correspondent party, who used to be unavailable, to participate in the conversation regardless of a presence or non-presence of the user's selection.

In addition, if the correspondent party that used to be unavailable enters the conversation available status, the terminal 100 allows the correspondent party that used to be unavailable to participate in the currently executed conversation using the previous contents of the conversation regardless of a presence or non-presence of the user's selection.

Figure 22A:
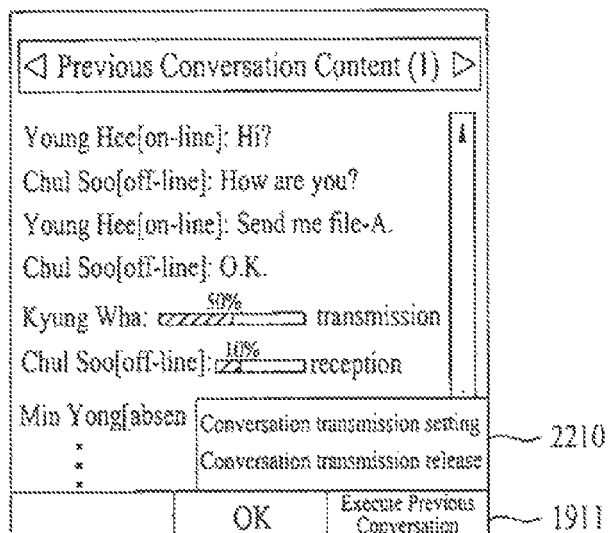

If the user selects the 'Conversation content transmission setting' option in FIG. 19, the terminal 100 displays a window 2210 allowing the user to select whether to transmit the previous contents of the conversation to the conversation correspondent party (FIG. 22A). The user is also able to set whether to transmit the previous contents of the conversation per the conversation correspondent party.

Figure 22B:
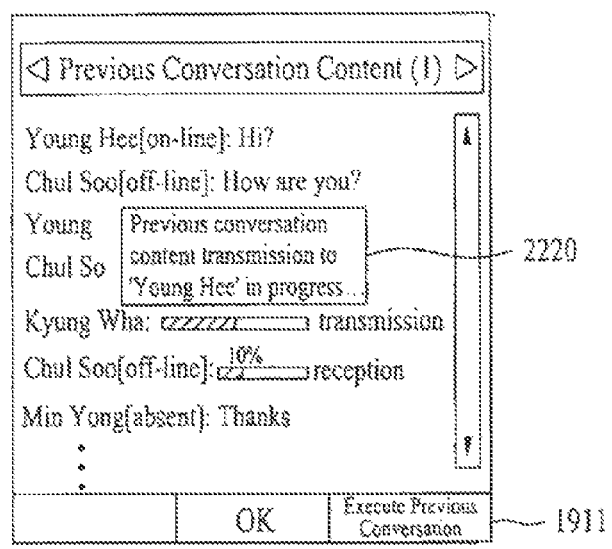

In addition, if the user selects the 'conversation transmission setting' option in FIG. 22A, the terminal 100 transmits the previous contents of the conversation to the conversation correspondent party and announces that the previous contents of the conversation is being transmitted to the conversation correspondent party (FIG. 22B).

Hence, a terminal of the conversation correspondent party is able to display the previous contents of the conversation together with the new contents of the conversation.

Figure 23A:
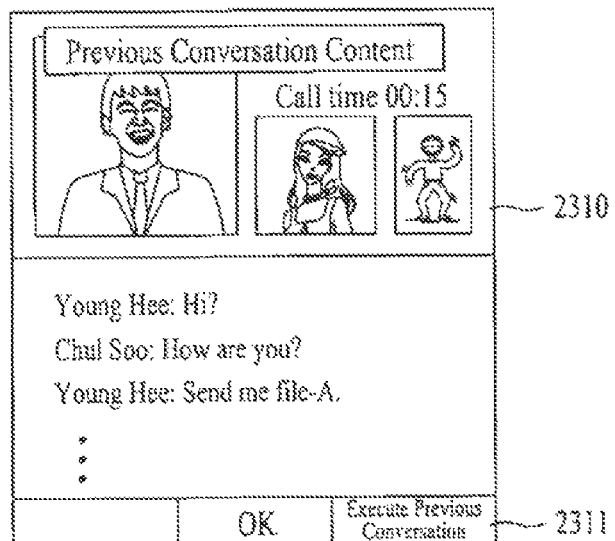
FIGS. 23A to 23C are overviews of display screens illustrating an operation of performing a conversation using previous contents of the conversation having been performed together with a video call service in a terminal according to an embodiment of the present invention.
Figure 23B:
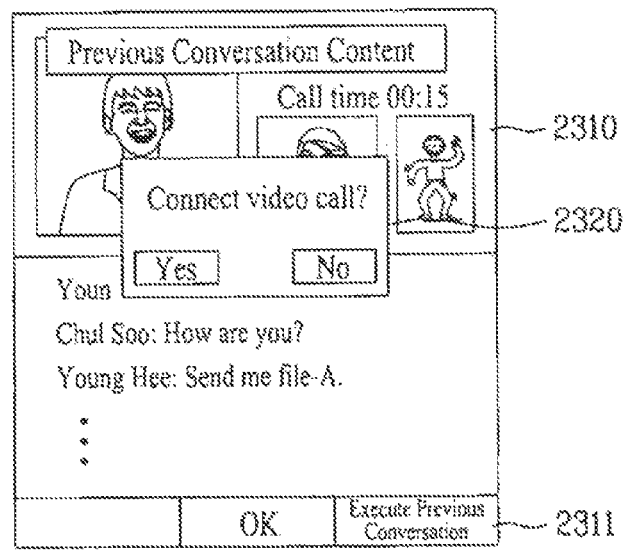
Figure 23C:
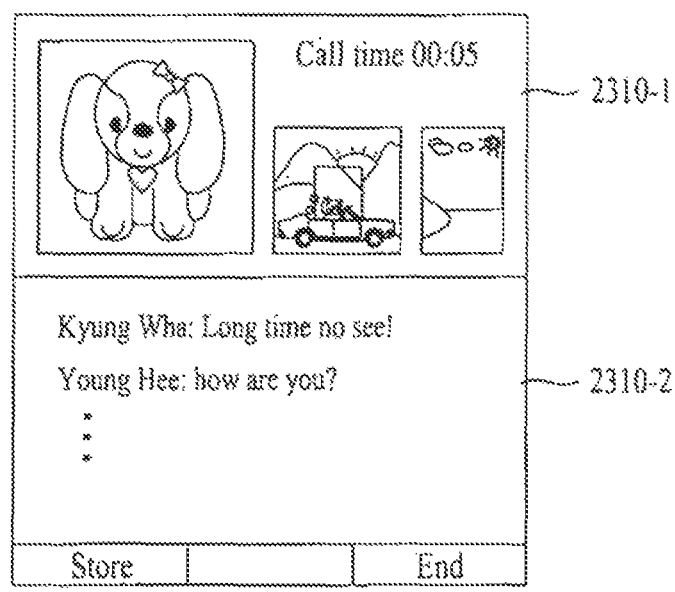

Next, FIGS. 23A to 23C are overviews of display screens illustrating an operation of performing a conversation using previous contents of the conversation having been performed together with a video call service. This embodiment is also applicable to performing a conversation together with a broadcast signal sharing service, a video sharing service, and/or a network game service, etc.

In addition, while the terminal 100 displays previous contents of the conversation and a video call image, the terminal 100 allows the user to select a 'Execute Previous Conversation' option 2311 for executing a conversation using the previous contents of the conversation (FIG. 23A).

In this embodiment, the terminal 100 displays status information of a party corresponding to an IMS or a video call service. If the user selects the 'Execute Previous Conversation' option 2311, the terminal 100 enables the user to select whether or not to connect the video call with parties of a video call executed together with the previous conversation (FIG. 23B). Further, in this instance, the user is able to select a specific party to be connected for the video call from a plurality of parties of the previous video call.

If the user selects 'Yes' (video call connect) in FIG. 23B, the terminal 100 performs the conversation using the previous contents of the conversation and simultaneously performs the video call with the parties of the previous video call or the selected one of the parties (FIG. 23C).

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

Accordingly, the present invention provides several advantages.

First, embodiments of the present invention facilitate a conversation through an IMS to be executed using previous contents of the conversation.

Secondly, embodiments of the present invention perform a conversation using previous contents of the conversation, thereby avoiding designating conversation parties one by one.

Thirdly, embodiments of the present invention perform a conversation using previous contents of the conversation, thereby enabling a previous conversation, which was disconnected, to continue.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display unit;
   a wireless communication unit configured to communicate with at least one external terminal via a wireless network; and
   a controller configured to:
   execute multiple services including a first message conversation with the at least one external terminal while executing a video communication with the at least one external terminal, and
   store at least one received or transmitted message of the first message conversation and multiple service relevant information in response to termination of the first message conversation, wherein the multiple service relevant information includes video images of the video communication captured upon termination of the first message conversation,
   wherein the controller is further configured to:
   display, on the display unit, a message conversation list including at least one message conversation item, wherein each of the at least one message conversation item represents a corresponding previous message conversation with a corresponding external terminal,
   in response to a first command of selecting a specific one of the at least one message conversation item in the message conversation list, display, on the display unit, at least one received or transmitted message belonging to the specific message conversation item, wherein the at least one received or transmitted message is displayed together with an incomplete file transceiving indicator when a file transceiving was incompletely terminated during a specific previous message conversation corresponding to the specific message conversation item, and
   in response to a second command of selecting a file transceiving option displayed together with the at least one received or transmitted message on the display unit, resume the file transceiving with respect to a specific external terminal corresponding to the selected message conversation item, and
   wherein the at least one received or transmitted message is displayed together with a second incomplete file transceiving indicator when a second file transceiving was incompletely terminated during the specific previous message conversation corresponding to the specific message conversation item.

2. The mobile terminal of claim 1, wherein the controller is further configured to, after termination of the first message conversation, display the at least one received or transmitted message of the first message conversation and the stored image of the video communication.

3. The mobile terminal of claim 2, wherein the controller is further configured to execute a second message conversation with the at least one external terminal using the stored at least one received or transmitted message of the first message conversation.

4. The mobile terminal of claim 3, wherein the second message conversation is a continuation of the first message conversation, and
   wherein the controller is further configured to display the stored at least one received or transmitted message of the first conversation followed by a new message of the second conversation.

5. The mobile terminal of claim 3, wherein the controller is further configured to automatically execute the video communication with the at least one external terminal in response to execution of the second message conversation with the at least one external terminal.

6. The mobile terminal of claim 3, wherein the controller is further configured to display a conversation execution option together with the at least one received or transmitted message of the first message conversation and the stored image of the video communication.

7. The mobile terminal of claim 6, wherein the controller is further configured to, in response to selection of the conversation execution option, execute the video communication with the at least one external terminal and the second message conversation with the at least one external terminal.

8. The mobile terminal of claim 2, wherein the controller is further configured to display a message conversation list including a message conversation item corresponding to the first message conversation, and
   wherein the message conversation item is displayed in an abbreviated style, when the message conversation item has an insufficient space to display the at least one received or transmitted message of the first message conversation.

9. The mobile terminal of claim 3, wherein the at least one external terminal includes a first external terminal and a second external terminal, and
   wherein the controller is further configured to execute the second message conversation with the first external terminal and the second terminal while executing the video communication with the first external terminal only.

10. The mobile terminal of claim 1, wherein the video communication is a video call.

11. A method of controlling a mobile terminal, the method comprising:
communicating, via a wireless communication unit, with at least one external terminal via a wireless network; and
executing, via a controller, multiple services including a first message conversation with the at least one external terminal while executing a video communication with the at least one external terminal; and
storing, via the controller, at least one received or transmitted message of the first message conversation and multiple service relevant information in response to termination of the first message conversation, wherein the multiple service relevant information includes video images of the video communication captured upon termination of the first message conversation; and
wherein the method further comprises:
displaying, on a display unit, a message conversation list including at least one message conversation item, wherein each of the at least one message conversation item represents a corresponding previous message conversation with a corresponding external terminal;
in response to a first command of selecting a specific one of the at least one message conversation item in the message conversation list, displaying, on the display unit, at least one received or transmitted message belonging to the specific message conversation item, wherein the at least one received or transmitted message is displayed together with an incomplete file transceiving indicator when a file transceiving was incompletely terminated during a specific previous message conversation corresponding to the specific message conversation item; and
in response to a second command of selecting a file transceiving option displayed together with the at least one received or transmitted message on the display unit, resuming the file transceiving with respect to a specific external terminal corresponding to the selected message conversation item, and
wherein the at least one received or transmitted message is displayed together with a second incomplete file transceiving indicator when a second file transceiving was incompletely terminated during the specific previous message conversation corresponding to the specific message conversation item.

12. The method of claim 11, further comprising:
after termination of the first message conversation, displaying the at least one received or transmitted message of the first message conversation and the stored image of the video communication.

13. The method of claim 12, further comprising:
executing a second message conversation with the at least one external terminal using the stored at least one received or transmitted message of the first message conversation.

14. The method of claim 13, wherein the second message conversation is a continuation of the first message conversation, and
wherein the method further comprises:
displaying the stored at least one received or transmitted message of the first conversation followed by a new message of the second conversation.

15. The method of claim 13, further comprising:
automatically executing the video communication with the at least one external terminal in response to execution of the second message conversation with the at least one external terminal.

16. The method of claim 13, further comprising:
displaying a conversation execution option together with the at least one received or transmitted message of the first message conversation and the stored image of the video communication.

17. The method of claim 16, further comprising:
in response to selection of the conversation execution option, executing the video communication with the at least one external terminal and the second message conversation with the at least one external terminal.

18. The method of claim 13, wherein the at least one external terminal includes a first external terminal and a second external terminal, and
wherein the method further comprises:
executing the second message conversation with the first external terminal and the second terminal while executing the video communication with the first external terminal only.

19. The method of claim 12, further comprising:
displaying a message conversation list including a message conversation item corresponding to the first message conversation,
wherein the message conversation item is displayed in an abbreviated style, when the message conversation item has an insufficient space to display the at least one received or transmitted message of the first message conversation.

20. The method of claim 11, wherein the video communication is a video call.

* * * * *